(12) United States Patent
Berger et al.

(10) Patent No.: US 6,773,738 B2
(45) Date of Patent: Aug. 10, 2004

(54) STEAM COOKING APPARATUS

(75) Inventors: Uwe Berger, Kirchlengern (DE); Hartmut Dittrich, Buende (DE); Thomas Metz, Buende (DE)

(73) Assignee: Imperial-Werke oHG., Buende (DE)

( * ) Notice: Subject to any disclaimer, the term of this patent is extended or adjusted under 35 U.S.C. 154(b) by 208 days.

(21) Appl. No.: 10/177,350

(22) Filed: Jun. 21, 2002

(65) Prior Publication Data

US 2003/0010221 A1 Jan. 16, 2003

(30) Foreign Application Priority Data

Jul. 10, 2001 (DE) .......................................... 101 32 581

(51) Int. Cl.⁷ .............................. A23L 1/00; A23L 3/00; A47J 27/04; A47J 27/16; A21B 1/24
(52) U.S. Cl. ............................ 426/510; 99/330; 99/331; 99/468; 99/483; 99/516; 126/20; 126/369; 219/401; 219/413; 219/417
(58) Field of Search ........................... 99/330–333, 339, 99/340, 337, 338, 341, 403–410, 400, 401, 415–418, 444–450, 467–470, 473–476, 516, 536, 483; 126/20, 369, 20.1, 20.2; 219/401, 400, 396, 398, 413, 521; 426/507, 523, 510, 511

(56) References Cited

U.S. PATENT DOCUMENTS

| | | | | |
|---|---|---|---|---|
| 4,373,430 A | * | 2/1983 | Allen .......................... | 99/468 |
| 4,455,924 A | * | 6/1984 | Wenzel ....................... | 99/333 |
| 4,483,243 A | * | 11/1984 | Cote ............................ | 99/468 |
| 4,587,946 A | * | 5/1986 | Doyon et al. ................. | 126/20 |
| 4,674,402 A | * | 6/1987 | Raufeisen .................... | 99/468 |
| 5,158,064 A | * | 10/1992 | Willis et al. .................. | 126/20 |
| 5,228,385 A | * | 7/1993 | Friedrich et al. ............. | 99/352 |
| 5,235,903 A | * | 8/1993 | Tippmann .................... | 99/331 |
| 5,272,963 A | * | 12/1993 | Del Fabbro ................... | 99/468 |
| 5,318,792 A | * | 6/1994 | Tippmann .................... | 426/510 |
| 5,441,034 A | * | 8/1995 | Bedford et al. ............... | 126/20 |
| 6,152,024 A | * | 11/2000 | Tippmann .................... | 99/472 |
| 6,658,995 B1 | * | 12/2003 | DeYoung et al. ............. | 99/468 |

* cited by examiner

Primary Examiner—Timothy F. Simone
(74) Attorney, Agent, or Firm—Karl Hormann

(57) ABSTRACT

A steam cooking apparatus with a steam generator and several cooking planes in a common cooking chamber in which there are arranged a steam input opening connected to the steam generator and a steam outlet opening whereby a temperature measuring device is associated with the cooking chamber and is connected to a control device.

For providing an energy-saving steam cooking apparatus for effectively controlling the temperature in the individual cooking planes there are associated with the cooking planes one or more steam input openings and/or one or more steam outlet openings and separate temperature measuring devices are arranged in at least two cooking planes.

In a method of cooking a multi-component meal regardless of the cooking times of the individual components thereof this meal is cooked simultaneously without interruption in a cooking operation, whereby a uniform temperature distribution is selected and maintained in the cooking chamber for a meal of an identical cooking time of all components and a differing temperature distribution is selected and maintained in the cooking planes or cooking sections for a meal with differing cooking times for individual components.

14 Claims, 4 Drawing Sheets

STEAM COOKING APPARATUS

BACKGROUND OF THE INVENTION

1. Field of the Invention

The invention relates to a steam cooking apparatus provided with a steam generator and a plurality of cooking levels in a cooking chamber within which there is provided a steam input opening connected to the steam generator and a steam outlet opening, and with a temperature measuring device associated with the cooking chamber and connected to a control device.

2. The Prior Art

It is generally known to detect the temperature in a cooking chamber and by the control device to control the feeding of steam into the cooking chamber as a function of the temperature. In this manner, the selected temperature at the temperature sensor is maintained steady for a preset cooking time; but deviating temperatures may occur at other sections of the cooking chamber.

A steam cooking apparatus of this kind is disclosed by German patent specification DE 199 60 743 A1, with a steam input opening being arranged in an upper section of the side wall facing the steam generator through which steam enters the cooking chamber from the steam generator. The steam outlet opening and a temperature sensor are, however, disposed in a lower section of the rear wall. This arrangement is to make possible the simultaneous cooking of food of like consistency, at the same temperature, at several cooking levels within the cooking chamber. It is often necessary, however, to prepare different foods of differing cooking periods for a single meal. This would necessitate sequentially to put foods of differing cooking periods into the cooking chamber. The door of the apparatus must thus be opened intermittently which causes steam to escape. Not only does this raise the humidity of the ambient working space, but as the program is continued the steam generator will have to generate and feed new steam into the cooking chamber. As a result, the amount of energy needed for generating steam is increased. Moreover, the actual temperatures at different locations within the cooking chamber have been found to deviate from the temperature measured at the temperature sensor. Under unfavorable conditions, this often leads to layers of steam of different temperatures in the horizontally disposed cooking levels in the cooking chamber. These different temperatures cannot be controlled and detrimentally affect the result of the cooking process.

OBJECTS OF THE INVENTION

It is an object of the invention to provide an energy saving steam cooking apparatus with a plurality of cooking sections.

Another object of the invention is to provide a steam cooking apparatus with a plurality of cooking planes in which cooking temperatures may be individually set.

Still another object of the invention resides in the provision of a steam cooking apparatus with a plurality of cooking planes in which individual cooking temperatures may be individually set by controlling the admission of steam.

In addition, it is an object of the invention to provide a process of cooking, in a steam cooking apparatus of the kind referred to, food made up of different components regardless of their cooking times.

Other objects will in part be obvious and will in part appear hereinafter.

BRIEF SUMMARY OF THE INVENTION.

In accordance with the invention these and other objects are accomplished by a steam cooking apparatus provided with a plurality of cooking sections each one of which is provided with at least one steam input opening and one steam outlet opening.

By arranging one or more steam input openings and/or outlet openings in different cooking levels, and by temperature measuring devices disposed in at least two cooking levels, the advantages more particularly derived by the invention reside in a controllable temperature distribution at all horizontally disposed cooking levels. Depending upon individual wishes, it is possible deliberately to provide either for a uniform temperature distribution in the entire cooking chamber or for different temperatures in individual cooking levels. In this manner, the beginning and the end of a cooking operation of otherwise different cooking periods may be synchronized which aside from a simultaneous preparation of the parts of a meal offers the particular advantage that the organization of preparing a meal is simplified. Different times such as the beginning and/or the termination of a cooking period may be pre-programmed, eliminating the need for intermediate activities or controls and the user's presence near the apparatus. The simultaneous cooking of different ingredients of otherwise differing cooking periods makes it possible to set, monitor and change the parameters by remote control.

In advantageous embodiments of the invention, the disposition, size, configuration and/or cross-section of the steam input openings and/or of the steam outlet openings may be changeable so as to associate individual ones with several cooking levels. In order to close them in selectable partial sections the steam input and outlet openings are advantageously provided with adjustment. In a particularly advantageous embodiment the adjustment devices are controlled by the temperature measuring devices. In this manner the size of the steam openings may be adjusted to the temperatures required for the food to be cooked in individual cooking levels. In a further advantageous embodiment steam input and steam outlet openings are disposed at the different cooking levels in the cooking chamber with which the temperature measuring devices are associated. In a favorable variant the steam input opening should be positioned in one of the upper cooking levels and at least two steam outlet openings should be positioned at different cooking levels. It is also advantageous to place one arrangement of the steam input opening in the lower cooking level and one arrangement of the steam outlet opening in the upper cooking level, or to place both steam openings in the upper cooking level. A further possibility is to place at least one steam input and at least one steam outlet opening at an upper as well as at a lower cooking level.

In a particularly advantageous embodiment of the invention, a divider may be placed into the cooking chamber for separating the cooking levels thereof, with or without lateral spaces towards the side walls. In such an arrangement, at least one steam outlet opening would be associated with each of the resulting cooking levels in order to provide for a precise separation of differing layers of temperatures in the cooking ranges or cooking levels. It is also advantageous that the divided cooking chamber allows the simultaneous use of not only one of the cooking compartments but all of them. In an advantageous embodiment a large cooking plate or similar vessel which may be slid into the lateral support frames is used as a cooking chamber divider.

The advantages resulting from the method in accordance with the invention are, in particular, that food made up of several items may be finished simultaneously regardless of the cooking time of the individual items. In the case of food items of the same cooking period a uniform temperature distribution is selected within the cooking chamber whereas in the case of food made up of items requiring different cooking times, different temperatures are selected and maintained during the entire cooking process in the cooking levels or areas. In an advantageous embodiment the temperatures at individual cooking levels or areas may be controlled by temperature measuring devices in connection with steam input and outlet openings which may be varied or adjusted in terms of their number and/or size and/or cross section.

DESCRIPTION OF THE SEVERAL DRAWINGS.

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS.

Figure 1:
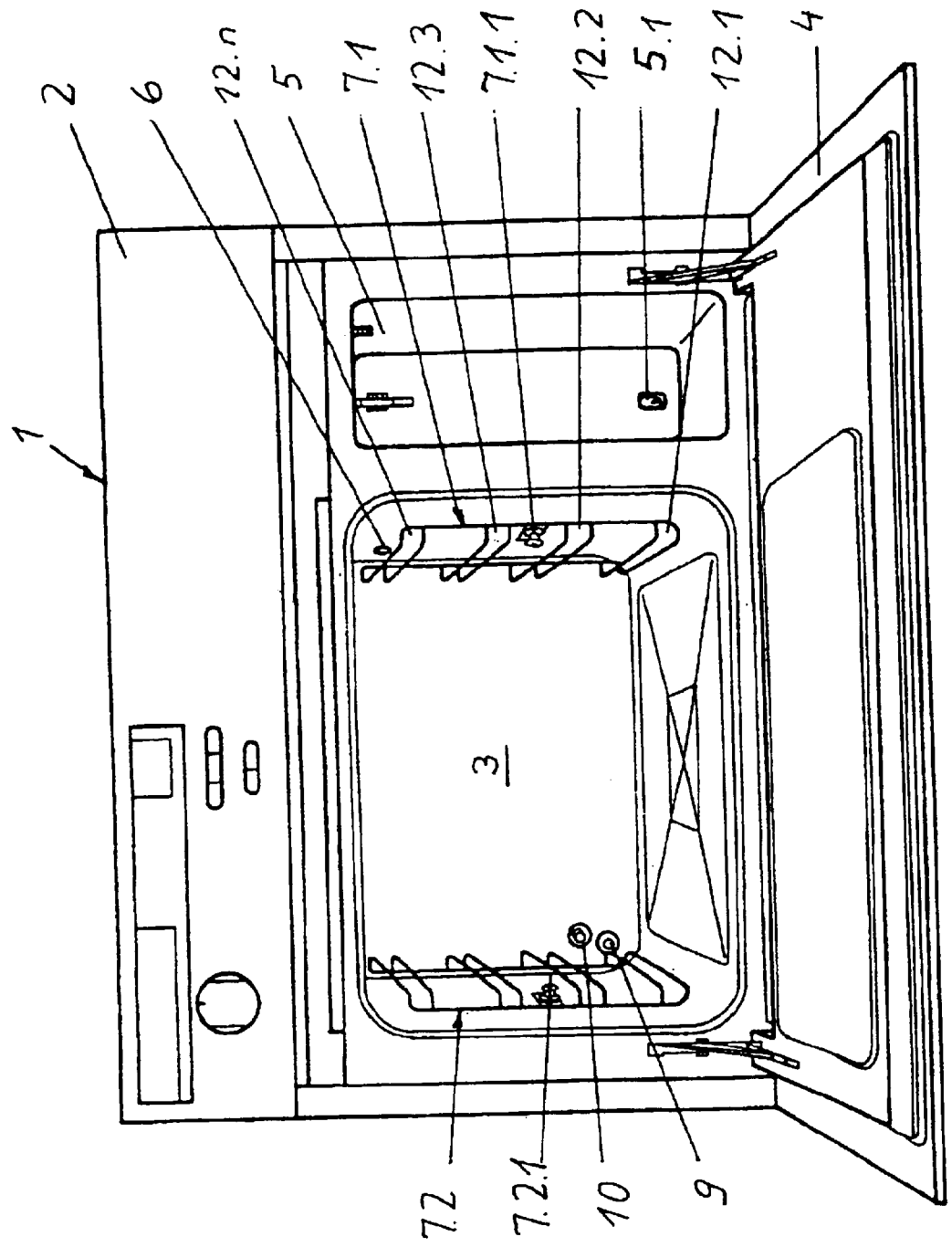
FIG. 1 depicts a steam cooking apparatus with an opened door.

FIG. 1 depicts a steam cooking apparatus 1 working without pressurized steam in accordance with the prior art provided with operating bezel 2, a cooking chamber 3 and an open apparatus door 4. Several operating and indicator elements are provided at the operating bezel 3. Laterally of the cooking chamber 3 there is provided a receiving chamber 5 for a water container which for the sake of better clarity is not shown, the chamber being connected, by way of a valve 5.1 to a steam generator, also not shown, disposed behind the valve. Steam from the steam generator travels to the cooking chamber 3 through a steam input opening 6 arranged in an upper region of a side wall of the cooking chamber 3. A temperature measuring device 10 is associated with a steam outlet opening 9 preferably disposed in a lower region of the rear wall, it being possible to arrange both of them in another side wall. Conventionally know temperature sensors may, for instance, be used as temperature measuring devices 10. In the cooking chamber 3 at its side walls there are arranged lateral receiving grids or rails 7.1, 7.2 for inserting cooking supports 8. The receiving grids 7.1, 7.2 may be removed and are provided with a quick connector 7.1.1, 7.2.1 to facilitate cleaning of the cooking chamber 3. It is also possible to connect the receiving grids 7.1, 7.2 to the walls of the cooking chamber by screws or immovably to mount them in the cooking chamber 3.

Figure 2:
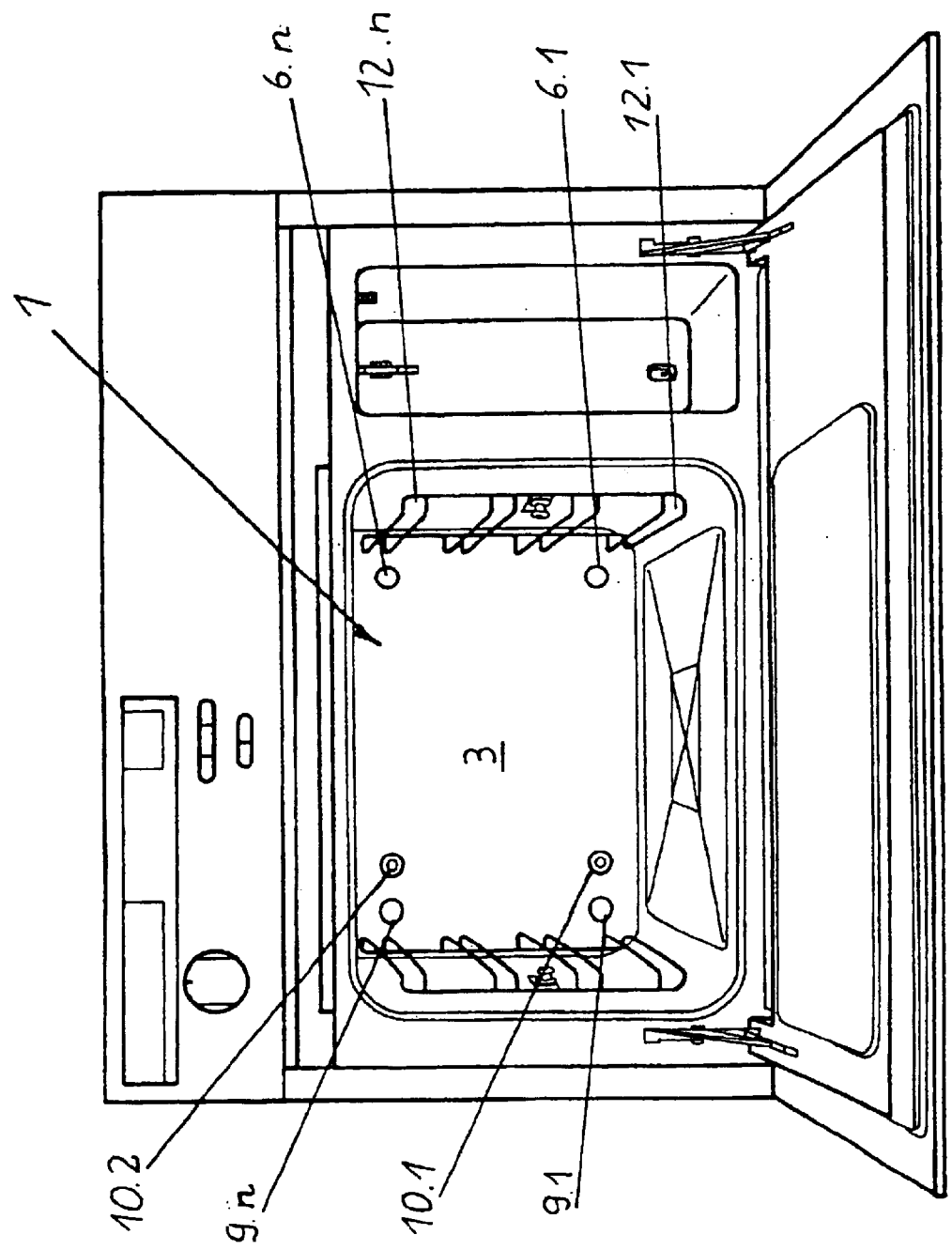
FIG. 2 depicts a steam cooking apparatus with several temperature sensors, steam input and steam outlet openings in its cooking chamber.

In FIG. 2, there is shown a steam cooking apparatus 1 with a cooking chamber 3 provided with several temperature measuring devices 10.1, 10.2 and two steam input openings 6.1, 6.n and steam outlet openings 9.1, 9.n. Whilst only two openings each with associated temperature measuring devices 10.1, 20.2 have been shown, their number may be further increased, depending upon the number of insertions possible in the receiving grids 7.1., 7.2. The horizontal cooking planes 12.1, 12.n relate to the insertion levels in the receiving grids 7.1, 7.2. In order to provide for an assured temperature control within the cooking chamber 3, at least two temperature measuring devices 10.1, 10.2 are to be provided in different cooking planes 12.1, 12.and which are associated with the steam outlet openings 9.1, 9.n disposed therein. This is of particular advantage in cases, for instance, in which the individual components required for a complete meal may be put into the cooking chamber 3 of the steam cooking apparatus 1 together and cooked without interruption, regardless of their cooking times. In such cases it is also possible to provide for programming and settings or monitoring by way of a remote control. Thus, organizing the work, especially of the person responsible for preparing the meal, could be simplified. However, care should be taken to place the component with the longest and shortest cooking time into the upper and lower cooking planes 12.n, 12.1, respectively. Steam enters the cooking chamber 3 from the steam generator through several steam input openings 6.1, 6.n. The temperature measuring devices 10.1, 10.2 are associated with the steam outlet openings 9, detect the temperatures prevailing in the different cooking planes 12.1–12.n and control the temperatures at their respective cooking planes 12.1–12.n by way of the electronic controls of the steam cooking apparatus 1 which are principally disposed behind the operating bezel 2.

Figure 3:
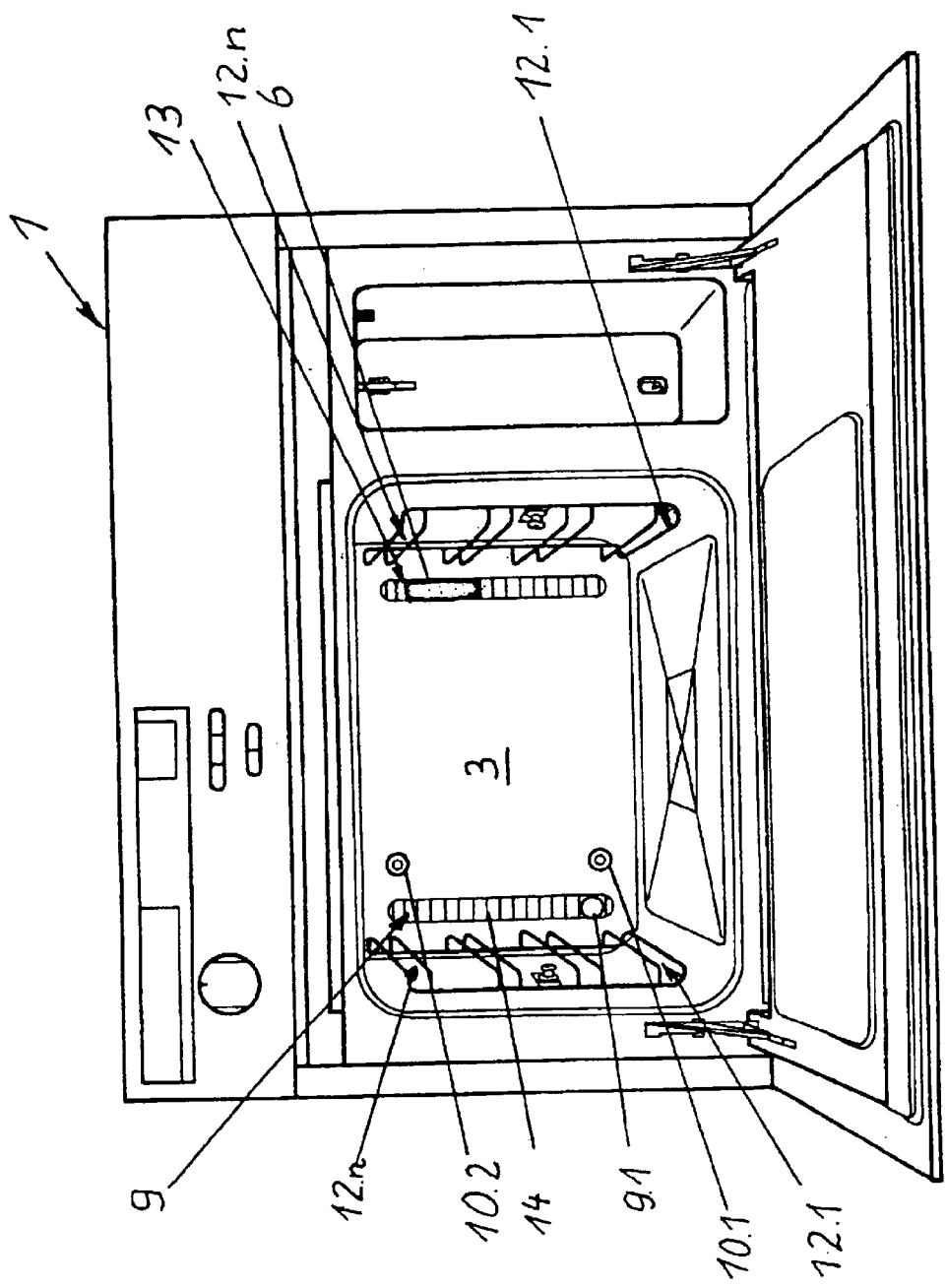
FIG. 3 depicts a steam cooking apparatus provided with steam input and outlet openings the size, shape and arrangement of which may be altered.

FIG. 3 depicts a steam cooking apparatus 1 which a cooking chamber 3 in which there are provided elongated steam input and steam outlet openings 6, 9, each one extending over several cooking planes 12.1–12.n. Adjustment devices 13, 14 open the steam input and outlet openings 6, 9 as a function of the temperatures required for different components and the cooking planes 12.1–12.n utilized. A steam input opening 6 may thus either extend over, or be disposed in, several cooking planes 12.1–12.n. Several horizontally disposed cooking planes 12.1–12.n of different temperature levels may be created by a steam cooking apparatus 1 in which shape, size and/or cross-sections of the steam input and/or outlet openings 6, 9 may be varied. The temperature measuring devices 10.1–12.m detect the temperatures prevailing at the different cooking planes 12.1–12.n and regulate adjustment devices 13, 14 by way of the control devices so as to close those steam outlet openings 9 not required for an actual cooking operation. The door 4 of the apparatus may remain closed during the entire cooking operation, and the entire menu will be finished at the same time. On the other hand, it would also be possible to achieve a uniform temperature distribution in the cooking planes 12.1–12.n by an identical arrangement of steam input and outlet openings 6, 9 and temperature measuring devices 10.1, 10.2 in the cooking planes 12.1–12.n.

Figure 4:
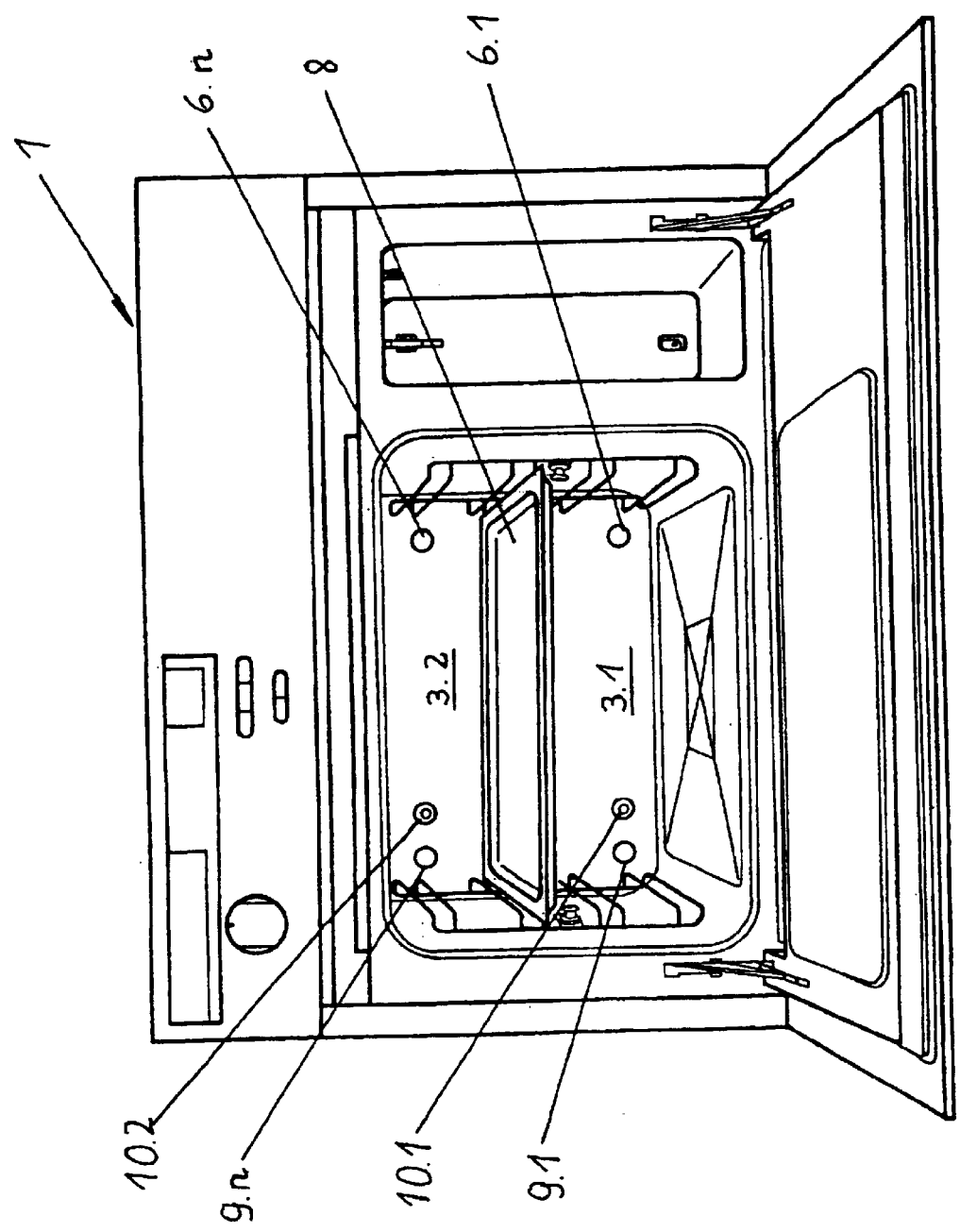
FIG. 4 depicts a steam cooking apparatus with a divider in its cooking chamber.

FIG. 4 shows a steam cooking apparatus with its door 4 in an open state and a cooking chamber divider 8 dividing the cooking chamber 3 into an upper cooking section 3.2 and a lower cooking section 3.1. Each separate cooking section 3.1, 3.2 is provided with a steam input opening 6.1, 6.n, a steam outlet opening 9.1, 9.n and a temperature measuring device 10.1, 10.2, making possible a controlled temperature setting in the individual cooking sections 3.1, 3.2. Only a small gap remains between the cooking chamber divider 8 and the side walls of the cooking chamber 3. A conventional cooking tray may be inserted as a cooking chamber divider 8 at different levels of the receiving grids 7.1, 7.2. In this manner, the interior of the cooking chamber 3 may be subdivided into separate cooking sections 3.1–3.$n$, and each cooking section 3.1–3.$n$ may be set at a different temperature. For instance, a steam input opening 6.1–6.$n$ and a steam outlet opening 9.1–9.$n$ may be provided in each cooking section 3.1, 3.$n$ with at least one temperature measuring device 10.1, 10.2 being associated with each steam output opening 9.1, 9.$n$. In every steam cooking apparatus 1 it is possible simultaneously to utilize several cooking planes 12.1–12.$n$ by several steam input and/or steam outlet openings 6, 9 whose size and cross-section may be varied and which are associated with at least two cooking planes 12.1–12.$n$ whereby the temperatures in each cooking plane 12.1–12.$n$ may be set for different temperatures or for a uniform temperature distribution.

What is claimed is:

1. A steam cooking apparatus, comprising:
   a steam generator;
   a cooking chamber;
   a plurality of cooking planes disposed in the cooking chamber;
   at least one steam input opening provided in each cooking plane and connected to the steam generator;
   at least one steam outlet opening;
   at least one temperature measuring device associated with each cooking plane; and
   means connected to the temperature measuring device for controlling the temperature in the associated cooking plane.

2. The steam cooking apparatus of claim 1, wherein at least one steam input opening and one steam outlet opening are arranged in each of at least two cooking planes and wherein the temperature measuring device is associated with the steam outlet opening.

3. The steam cooking apparatus of claim 1, wherein a steam input opening is arranged in an upper cooking plane and a first steam outlet opening is arranged in a lower cooking plane and wherein a second steam outlet opening is arranged in an upper cooking plane.

4. The steam cooking apparatus of claim 1, wherein a first steam input opening is arranged in the lower cooking plane and a second steam input opening is arranged in the upper cooking plane and wherein the steam outlet opening is arranged in at least one of the lower and upper cooking planes.

5. The steam cooking apparatus of claim 1, wherein a steam inlet opening is arranged in the lower cooking plane and a first steam outlet opening is arranged in the lower cooking plane and wherein a second steam outlet opening is arranged in the upper cooking plane.

6. The steam cooking apparatus of claim 1, wherein at least one of the steam input opening and the steam outlet opening is provided with means for changing at least one of its size and shape.

7. The steam cooking apparatus of claim 1, wherein at least one of the steam input opening and the steam outlet opening is provided with an adjustment device connected to the temperature measuring device for at least partially closing at least one of the steam inlet and steam output opening in response to the measured temperature.

8. The steam cooking apparatus of claim 6, wherein the means for changing the size of the steam input opening and steam outlet opening is associated with more than one cooking plane.

9. The steam cooking apparatus of claim 1, further comprising a cooking chamber divider removably arranged in the cooking chamber for dividing the cooking chamber into at least two cooking sections each provided with at least one cooking plane, each cooking section having at least one steam outlet opening associated therewith.

10. The steam cooking apparatus of claim 9, further comprising a plurality of lateral receiving grids in the cooking chamber and wherein the cooking chamber divider is a large meal support adapted to be inserted into the lateral receiving grids.

11. A method of cooking in a steam cooking apparatus of claim 1, comprising the steps of:
    placing a meal comprising components of identical cooking times into the cooking chamber, and
    exposing the components to a temperature uniformly distributed in the cooking chamber.

12. A method of cooking in a steam cooking apparatus of claim 1, comprising the steps of:
    placing a meals comprising components of different cooking times into the cooking chamber, and
    exposing the components to temperatures set differently as a function of the cooking times of the components, whereby cooking of the components is terminated substantially simultaneously.

13. The method of claim 12, wherein the temperatures are set by controlling the admission of steam to the different components by changing at least one of the size and number and cross-section of at least one of the steam inlet openings by temperature measuring devices.

14. The method in of claim 13, wherein components of a long cooking time is exposed to a high temperature in an upper cooking section and wherein the component of a short cooking time is simultaneously cooked in a lower cooking plane at a lesser temperature.

* * * * *